July 29, 1969     A. J. WILLIAMS     3,457,951
HYDRAULIC VALVE
Filed Sept. 19, 1967
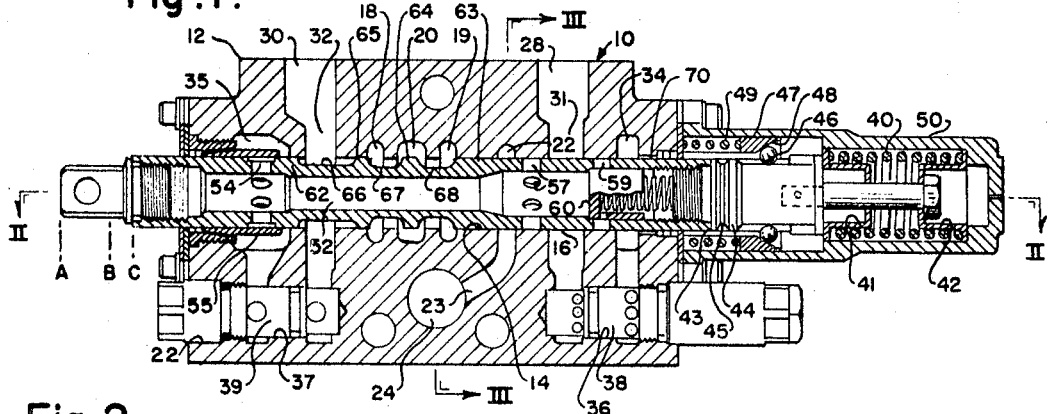
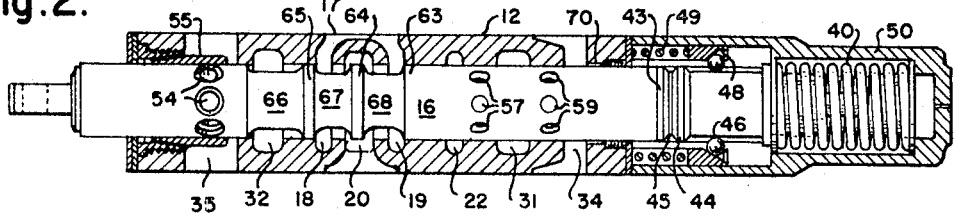
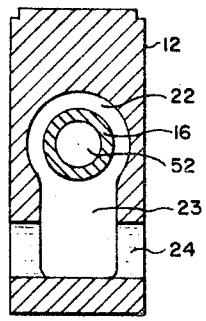
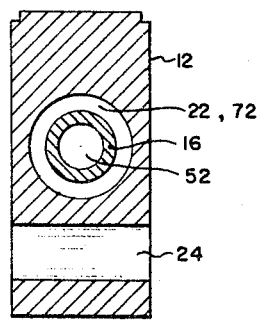
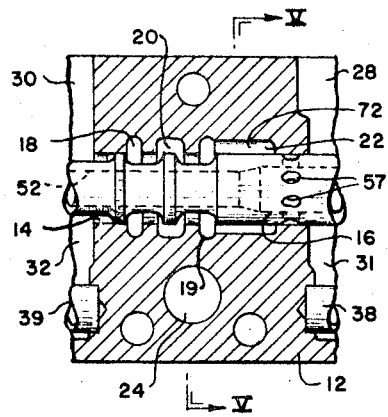
INVENTOR
Arthur J. Williams

# United States Patent Office 3,457,951
Patented July 29, 1969

3,457,951
HYDRAULIC VALVE
Arthur J. Williams, Hubbard, Ohio, assignor to Commercial Shearing & Stamping Company, a corporation of Ohio
Filed Sept. 19, 1967, Ser. No. 668,760
Int. Cl. F16k 3/26
U.S. Cl. 137—596                              8 Claims

ABSTRACT OF THE DISCLOSURE

A hydraulic parallel float valve section including a body having a longitudinal bore, intercommunicating inlet and outlet chambers, a pair of work port chambers, a pair of exhaust chambers and a branch chamber communicating with a parallel flow passageway. A slidable hollow spool valve element is received in the longitudinal bore and is shiftable from a neutral position to one of two work positions and to a float position. When the valve element is in the work positions, fluid flow is blocked between the inlet and outlet chambers while fluid flows to one or the other of the work port chambers. When the valve element is in the float position, fluid flows between the inlet and outlet chambers and the work port chambers are connected to each other through the hollow portion of the valve.

---

This invention relates to hydraulic valves and particularly to hollow spool parallel flow-float valve sections.

In order to provide float capability in hollow spool valves of well known types, complicated internal cores are generally necessary. Oftentimes it is also desirable to make such a float valve capable of providing parallel fluid flow. Such a parallel flow-float valve becomes even more complicated as the coring becomes more intricate. Accordingly, the valve assemblies also become undesirably larger, as well as being very expensive to manufacture.

I have invented a hydraulic valve structure, preferably in sectional form, having parallel flow and float capabilities having a relatively simple core construction and generally smaller in overall size compared to other parallel flow-float type valves.

In a preferred embodiment of my invention, I provide a valve body having a longitudinal bore, inlet means, and outlet means; an inlet chamber intersecting the bore and communicating with the inlet means; an outlet chamber intersecting the bore and communicating with the inlet means; an outlet chamber intersecting the bore spaced from the inlet chamber and communicating with the outlet means; a passage through the body transverse to the bore in a plane generally parallel to and spaced from the planes of the inlet and outlet chambers and the bore; first and second work port chambers intersecting the bore, one on each side of the inlet and outlet chambers; a branch chamber between the first work port chamber and the inlet chamber and communicating with the passage; a first exhaust passage intersecting the bore adjacent the first work port chamber and communicating therewith; a second exhaust chamber intersecting the bore adjacent the second work port chamber and communicating therewith; a valve element selectively shiftable longitudinally of the bore from a neutral position in which fluid entering the inlet chamber passes to the outlet chamber through the bore around a first reduced portion of the valve element to one of two work positions and a float position, the valve element having a hollow portion extending between the end portions thereof, the valve element being adapted when in the first work position to block communication between the inlet and outlet chambers while connecting the branch chamber with the first work port chamber through first openings in the valve element communicating with the hollow portion and connecting the second work port chamber through the bore with the second exhaust chamber, and when in the second work position to block communication between the inlet and outlet chambers while connecting the inlet chamber with the second work port chamber through the bore around a second reduced portion of the valve element and connecting the first work port chamber with the second exhaust chamber through the first openings in the valve element and second openings in the valve element communicating with the hollow portion and connecting the first work port chamber with the first exhaust chamber through third openings in the valve element communicating with the hollow portion, and when in the float position to connect the inlet and outlet chambers through the bore around the second reduced portion and part of the first reduced portion of the valve element while connecting the first work port chamber with the second work port chamber through the first and second openings in the valve element and connecting the first work port chamber to the first exhaust chamber through the first and third openings in the valve element and the bore and connecting the second work port chamber to the first exhaust chamber through the second and third openings and the bore.

Other details, objects and advantages of the invention will become apparent as the following description of preferred embodiments thereof proceeds.

In the accompanying drawings, I have shown preferred embodiments of the invention in which:

FIGURE 1 is a longitudinal sectional view through a hydraulic parallel flow-float valve embodying my invention and showing the valve element in a neutral position;

FIGURE 2 is a view taken along the line II—II of FIGURE 1;

FIGURE 3 is a view taken along line III—III of FIGURE 1:

FIGURE 4 is a partial longitudinal section view of a hydraulic valve similar to that of FIGURE 1 embodying my invention in another form and showing the partial valve element in a neutral position;

FIGURE 5 is a view taken along the line V—V of FIGURE 4.

Referring now to the drawings wherein like reference numerals refer to like parts throughout the various figures, 10 generally designates a hydraulic parallel flow-float valve section, including an elongated body 12 adapted to the attached with other hydraulic valve body sections by nuts and bolts, for example, to form a desired multi-valve arrangement. Such arrangements are well-known as typified by the series-parallel-priority valve arrangement disclosed in U.S. Patent No. 3,329,169, granted July 4, 1967. Body 12 has a longitudinal bore 14 extending therethrough with a double action sliding valve element 16 being suitably received therein. A bifurcated inlet passage 17 having chambers 18 and 19 intersecting bore 14 receives high pressure fluid from a source, not shown, through an inlet section, also not shown but well known in the art. An outlet chamber 20 intersects bore 14 between inlet chambers 18 and 19. A branch chamber 22 intersects bore 14 adjacent chamber 19 and communicates through passage 23 with a passage 24 lying in a plane spaced beneath and generally parallel to the plane of the inlet and outlet chambers 18 and 19 and bore 14. Passage 24 extends transversely between the lateral faces of body 12, as viewed in FIGURE 3, and receives high pressure fluid from a source not shown, preferably the same source which supplies high pressure fluid to inlet passage 17. Work ports 28 and 30 open out of body 14 and communicate with chambers 31 and 32 intersecting bore 14 on opposite sides of branch chamber 22 and inlet chamber 17, respectively. Exhaust chambers 34 and 35 intersect bore 14 on opposite sides of work chambers 31 and 32, respectively, and communicate with the respective work chambers through passages 36 and 37. A pressure responsive relief valve 38 is suitably received in passage 36 and extends between lower portions of work chamber 31 and exhaust chamber 34 and further extends longitudinally outwardly of body 12. An anticavitation pressure responsive check valve 39 is suitably received in passage 37 and extends between lower portions of work chamber 32 and exhaust chamber 35 and further extends outwardly of exhaust chamber 35 into a longitudinal recess 70 formed in body 12.

Valve elements 16 are shown in a neutral position and can be shifted in one of two work positions and into a float position by any well known means, as by suitable linkages, for example, connected to the left side of valve element 16, as viewed in FIGURE 1. Valve element 16 is urged into its neutral position by a helical coil spring 40 urging a force on either collar member 41 or 42 suitably arranged on the right hand end portion of valve element 16, with the direction of the force depending on the longitudinal position of the valve element. A pair of longitudinally spaced radially outwardly extending annular extensions 43 and 44 are formed on valve element 16 leftwardly of collar member 41. Annular extensions 43 and 44 define an annular recess 45 therebetween. A plurality of balls 46 extend circumferentially about a portion of valve element rightwardly of annular extension 44, such balls sized to fit into recess 45. An annular sleeve 47 having an inclined right face 48 engages balls 46. A helical coil spring 49 in compression is suitably arranged between the right end portion of body 12 and the left face of sleeve 47, and urges a force on sleeve 47 which force is transmitted to the balls 46. When the valve element 16 is in float position as will be shown hereinafter, the balls 46 will be urged into annular recess 45 and will serve to lock valve element 16 in the float position. A hollow housing 50 suitably fixed to the right end of body 12 encloses spring 40, collar members 41 and 42, annular extensions 43 and 44, balls 46, sleeve 47 and spring 49.

Valve element 16 has a hollow portion 52 extending between the left and right end portions thereof. A plurality of circumferentially spaced openings 54 extend through a left end portion of valve element 16 and communicate with the hollow portion 52. Openings 54 are disposed in a vertical plane passing through exhaust chamber 34. A cylindrical sleeve 55 is suitably received in bore 14 at the left end portion thereof and extends longitudinally inwardly to a vertical plane lying in exhaust chamber 35 and longitudinally beyond openings 54. Thus, sleeve number 55 closes openings 54 to exhaust chamber 34 while valve element 16 is in a neutral position. A plurality of circumferentially spaced openings 57 extend through an intermediate portion of valve element 16 to communicate with a substantially right portion of hollow portion 52. Rightwardly of openings 57 another plurality of circumferentially spaced openings 59 extends through valve element 16 to communicate with a right portion of hollow portion 52. A spring urged check valve 60 suitably arranged in hollow portion 52 at the right end portion of valve element 16 closes openings 59.

Valve element 16 has a left land 62, right land 63, a central land 64 and an intermediate land 65 disposed leftwardly of central land 64. Groove 66 is defined between left land 62 and intermediate land 65, and grooves 67 and 68 are defined between intermediate land 65 and a central land 64, and central land 64 and right land 63, respectively.

In operation of valve assembly 10, with the valve element 16 in the neutral position as shown in FIGURE 1, the work chambers 31 and 32 are blocked as pressurized fluid entering body 12 through inlet chamber 18 and 19 flows to outlet chamber 20 around grooves 67 and 68, while fluid may also flow to passage 24. When valve element is moved leftwardly to position A, noted by the phantom line, the open center is blocked to thereby pressurize inlet chambers 18 and 19 while preventing flow between the inlet chambers and outlet chamber 20. Pressurized fluid will flow from passage 24 through passage 23 into branch chamber 22 and then into openings 57 to fill hollow portion 52. The pressure of the fluid moves check valve 60 rightwardly to thereby expose openings 59 and the fluid then flows through openings 59 into work chamber 31 and outwardly of work port 28 into a work cylinder or the like. Exhaust fluid from the cylinder will flow into body 12 through work port 30 into chamber 32 across groove 66 into exhaust chamber 35 and then outwardly of body 12 to a reservoir. Thus, with valve element 16 in the A position work port chamber 31 and work port 28 will be in parallel with any other ports similarly connected with passage 24.

When valve element 16 is moved rightwardly to position B, noted by the phantom line, open center is again blocked to prevent pressurized fluid to flow between inlet chambers 18 and 19 and outlet chamber 20. Pressurized fluid will flow from inlet chamber 18 around groove 66 into work chamber 32 and then out of work port 30 into a work cylinder or the like. Pressurized fluid may also flow through passage 24, but such flow does not affect the internal flow of fluid within valve body 12. Exhaust fluid from the cylinder will flow through port 28 into work chamber 31 through openings 57 into hollow portion 52 and then out of hollow portion 52 through left openings 54 and into exhaust chamber 35 and then outwardly of body 12 into a reservoir. The exhaust fluid may also flow from chamber 31 through openings 57 into hollow portion 52 out of hollow portion 52 through openings 59 and into exhaust chamber 34. With valve element 16 in position B, parallel flow exists between pressurized fluid entering body 12 through inlet chamber 18 to work port 30 and pressurized fluid flowing through passage 24.

With the valve element 16 in the float position as noted by C and the phantom line associated therewith, open center is open and pressurized fluid flows between inlet chambers 18 and 19 and outlet chamber 20. Openings 54 are aligned with work chamber 32 while openings 57 are aligned with work chamber 31. Thus, a clear path exists between work chambers 31 and 32 through hollow portion 52 of valve element 16. Fluid can then flow between the work chambers 31 and 32 as external forces dictate. The cylinder which work ports 28 and 30 communicate will now be in a neutral or float position. Any unequal volumes of fluid between the two sides of this cylinder can be readily accommodated by flow through hollow portion 52 of valve element 16 past check valve 60 through clearance 70 between bore 14 and valve element 16 and into exhaust chamber 34 and then outwardly of body 12 into a reservoir. In the event that any fluid is needed to fill a void on either side of the work cylinder, such fluid can enter into work chamber 32 through anticavitation check valve 39 from exhaust chamber 35 through openings 54 in valve element 16. Such replenishment fluid can also readily flow through hollow portion 52 of valve element 16 into work chamber 31 through openings 57.

It should also be noted that when valve element 16 is in the float position, a controlled spring pressure on check valve 60 can be used together with the proper sizing of the clearance 70 in bore 14, if desired, to determine the rate at which fluid is permitted to escape from the work cylinder through the respective work chambers 31 and 32, and outwardly of body 12 into a reservoir.

Another embodiment of my invention is shown in FIGURES 4 and 5. As is shown, passageway 23 as was previously described is eliminated between flow passage 24 and branch chamber 22. Passage 24 remains in valve body 12 for passage of fluid therethrough, but does not have any direct relationship to the operation of the valve embodiment of FIGURE 4. In place of passage 23, bore 14 is widened between inlet chamber 19 and branch chamber 22. With that element 16 in position A pressurized fluid will flow from inlet chamber 19 through enlarged bore portion 72 into branch chamber 22 through openings 57 into hollow portion 52 and then through openings 59 and into work chamber 31 and then out of body 12 through work port 28. Pressurized fluid will also flow through passage 24. Thus, parallel flow will exist between work chamber 31 and passage 24. The operation of the valve section of FIGURES 4 and 5 will be the same when the valve element 16 thereof is shifted, either into work position B or into the float position.

While I have shown and described present preferred embodiments of the invention it is to be distinctly understood that the invention is not limited thereto, but may be otherwise variously embodied with the scope of the following claims.

I claim:
1. A hydraulic valve section comprising: an elongated body having a longitudinal bore, and an inlet chamber means intersecting said bore; an outlet chamber intersecting said bore spaced from said inlet chamber means; a passage through said body transverse to said bore in a plane generally parallel to and spaced from the planes of said inlet chamber means and said outlet chamber and said bore; first and second work port chambers intersecting said bore, one on each side of said inlet chamber means and said outlet chamber; a branch chamber between said first work port chamber and said inlet chamber means and communicating with said passage; a first exhaust chamber intersecting said bore adjacent said first work port chamber and communicating therewith; a second exhaust chamber intersecting said bore adjacent said second work port chamber and communicating therewith; a valve element selectively shiftable longitudinally of said bore from a neutral position in which fluid entering said inlet chamber means passes to said outlet chamber through said bore around a first reduced portion of said valve element to one of two work positions and a float position, said valve element having a hollow portion extending between the end portions thereof, said valve element having means adapted when in said first work position to block communication between said inlet chamber means and said outlet chamber while connecting said branch chamber with said first work port chamber through first openings in said valve element communicating with said hollow portion and connecting said second work port chamber through said bore with said second exhaust chamber and when in said second work position to block communication between said inlet chamber means and said outlet chamber while connecting said inlet chamber means with said second work port chamber through said bore around a second reduced portion of said valve element and connecting said first work port chamber with said second exhaust chamber through said first openings and second openings in said valve element communicating with said hollow portion and connecting said first work port chamber with said first exhaust chamber through third openings in said valve element communicating with said hollow portion and when in said float position to connect said inlet chamber means and said outlet chamber through said bore around said second reduced portion and part of said first reduced portion while connecting said first work port chamber with said second work port chamber through said first and second openings in said valve element and connecting said first work port chamber to said first exhaust chamber through said first and third openings and said bore and connecting said second work port chamber to said first exhaust chamber through said second and third openings and said bore.

2. A hydraulic valve section as set forth in claim 1 wherein when said valve element is in said first work position said second work port chamber is connected to said second exhaust chamber around said second reduced portion of said valve element.

3. A hydraulic valve section as set forth in claim 1 including pressure responsive check valve means in said hollow portion of said valve element adjacent said third openings and closing said third openings when said valve element is in said neutral position and in said second work position.

4. A hydraulic valve section as set forth in claim 3 including an elongated enclosure means supported by said body adjacent said second exhaust chamber and extending in said bore to an intermediate position of said second exhaust chamber for closing said second openings when said valve element is in said neutral and said first work positions while opening said second openings to said exhaust chamber when said valve element is in said second work position.

5. A hydraulic valve section comprising: an elongated body having a longitudinal bore; inlet chamber means intersecting said bore; an outlet chamber intersecting said bore spaced from said inlet chamber means; first and second work port chambers intersecting said bore, one on each side of said inlet chamber and said outlet chamber; a branch chamber between said first work port chamber and said inlet chamber means and communicating with said inlet chamber means through said bore; a first exhaust chamber intersecting said bore adjacent said first work port chamber and communicating therewith; a second exhaust chamber intersecting said bore adjacent said second work port chamber and communicating therewith; a valve element selectively shiftable longitudinally of said bore from a neutral position in which fluid entering said inlet chamber means passes to said outlet chamber through said bore around a first reduced portion of said valve element to one of two work positions and a float position, said valve element having a hollow portion extending between the end portions thereof, said valve element having means adapted when in said first work position to block communication between said inlet chamber means and said outlet chamber while connecting said inlet chamber means with said branch chamber through said bore and connecting said branch chamber with said first work port chamber through first openings in said valve element communicating with said hollow portion and connecting said second work port chamber through said bore with said second exhaust chamber and when in said second work position to block communication between said inlet chamber means and said outlet chamber while connecting said inlet chamber with said second work port chamber through said bore around a second reduced portion of said valve element and connecting said first work port chamber with said second exhaust chamber through said first openings and second openings in said valve element communicating with said hollow portion and connecting said first work port chamber with said first exhaust chamber through third openings in said valve element communicating with said hollow portion and when in said float position to connect said inlet chamber means and said outlet chamber through said bore around said second reduced portion and part of said first reduced portion while connecting said first work port chamber with said second work port chamber through said first and second openings in said valve element and connecting said first work port chamber to said first exhaust chamber through said first and third openings and said bore and connecting said second work port chamber to said first exhaust chamber through said second and third openings and said bore.

6. A hydraulic valve section as set forth in claim 5 wherein when said valve element is in said first work position, said second work port chamber is connected to said second exhaust chamber around said second reduced portion of said valve element.

7. A hydraulic valve section as set forth in claim 5 including pressure responsive check valve means in said hollow portion of said valve element adjacent said third openings and closing said third openings when said valve element is in said neutral position and in said second work position.

8. A hydraulic valve section as set forth in claim 7 including an elongated enclosure means supported by said body adjacent said second exhaust chamber and extending in said bore to an intermediate position of said second exhaust chamber for closing said second openings when said valve element is in said neutral and said first work position while opening said second openings to said exhaust chamber when said valve element is in said second work position.

References Cited

UNITED STATES PATENTS

| | | | |
|---|---|---|---|
| 2,651,324 | 9/1953 | Hodgson et al. | 137—596.12 |
| 2,949,097 | 8/1960 | Vander Kaay | 137—625.68 |
| 3,160,174 | 12/1964 | Schmiel et al. | 137—625.63 |
| 3,195,559 | 7/1965 | Stacey | 137—596.13 XR |
| 3,329,169 | 7/1967 | Hodgson et al. | 137—625.68 |

HENRY T. KLINKSIEK, Primary Examiner

U.S. Cl. X.R.

137—625.68